May 7, 1935.  B. O. GODFREY  2,000,281
TRAMMEL POINT FOR PITCHOMETERS
Filed July 27, 1932    3 Sheets-Sheet 1
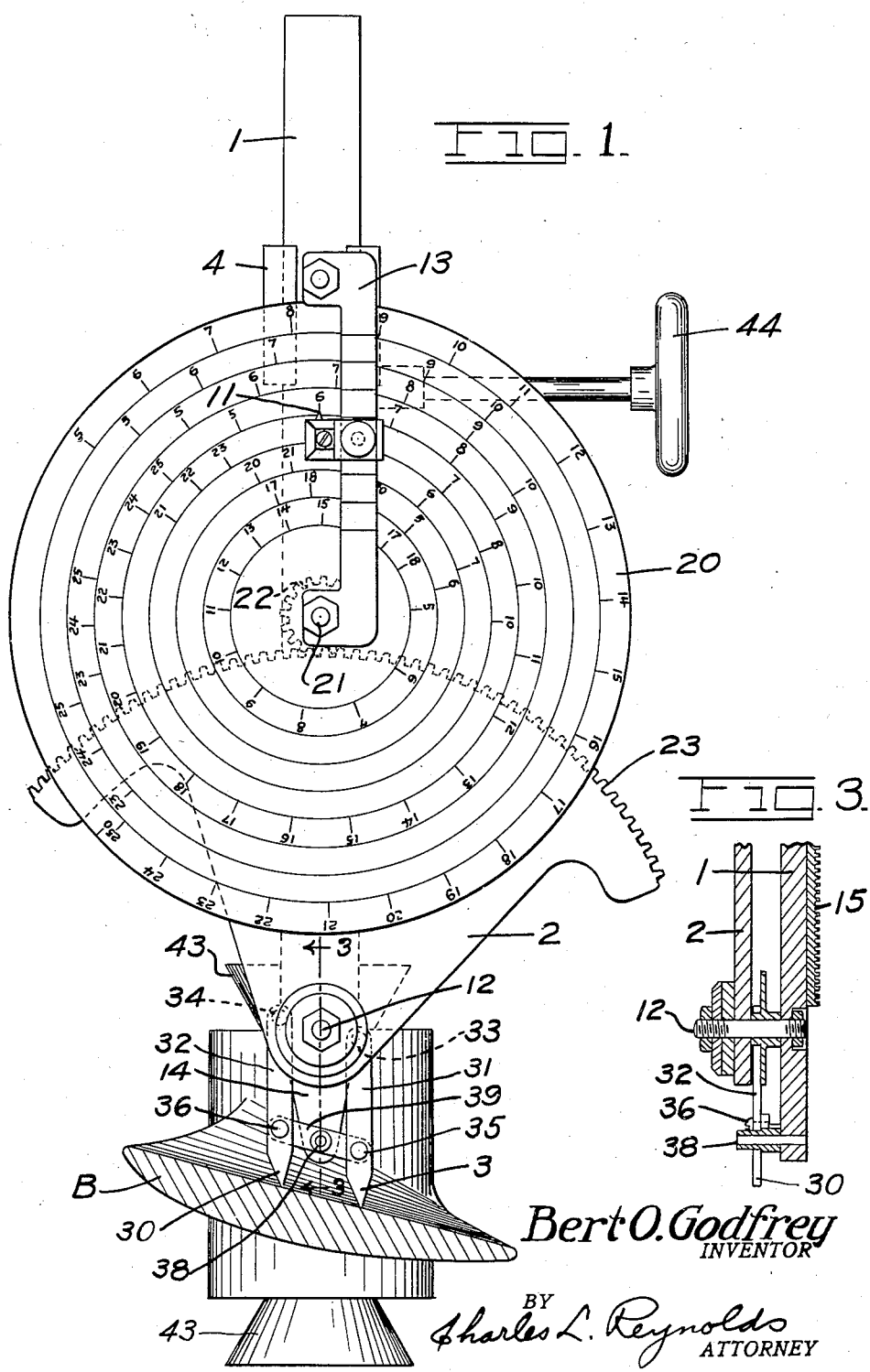

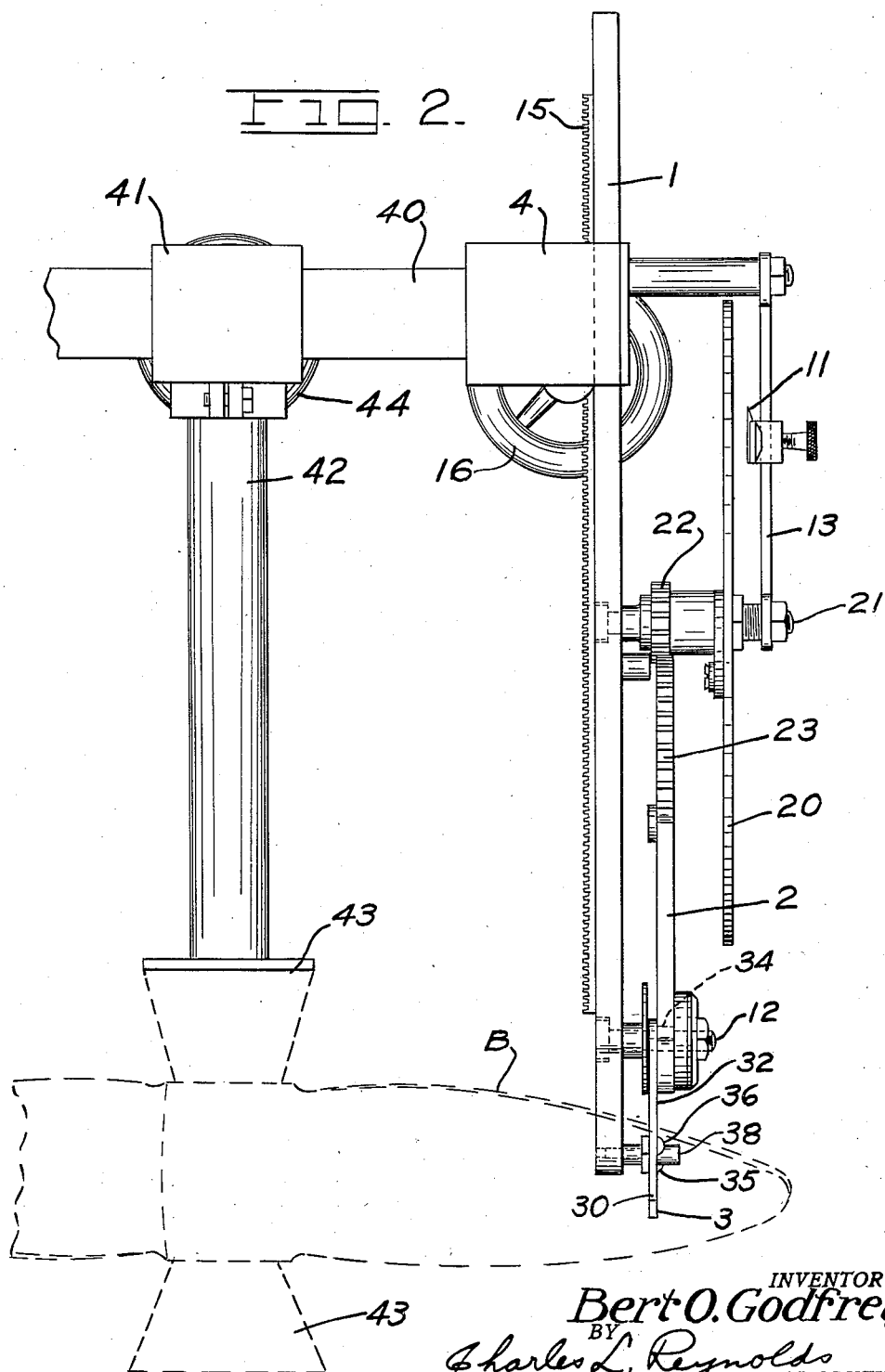

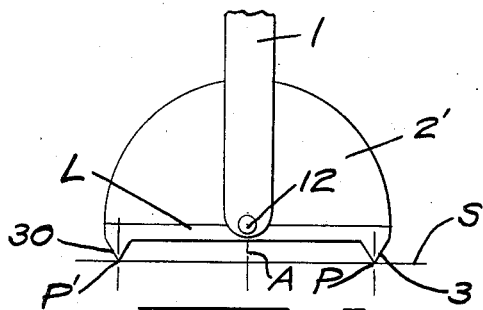
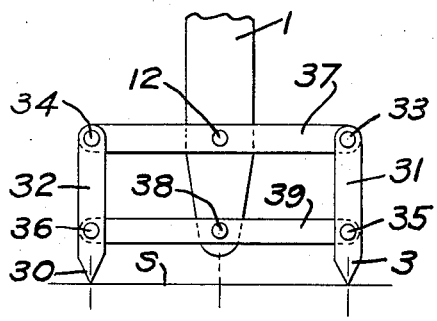
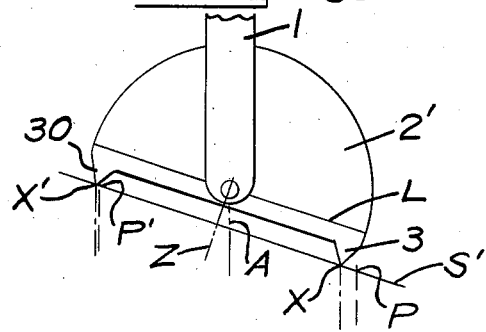
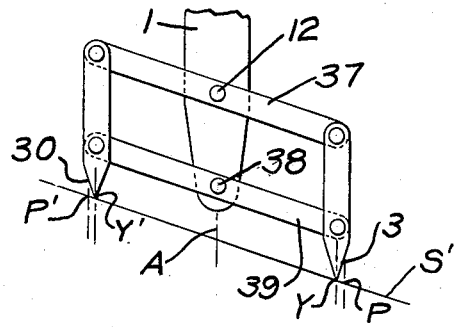
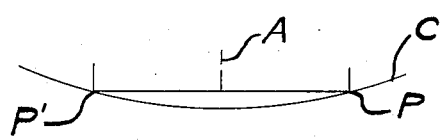
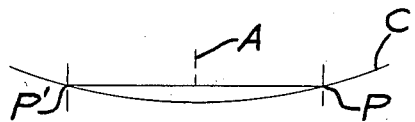
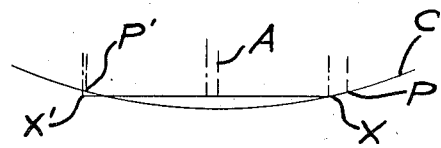

Patented May 7, 1935

2,000,281

UNITED STATES PATENT OFFICE 2,000,281

TRAMMEL POINT FOR PITCHOMETERS

Bert O. Godfrey, Brooklyn, N. Y.

Application July 27, 1932, Serial No. 624,981

9 Claims. (Cl. 33—174)

My invention relates to pitchometers, that is to say, to tools which are intended for the measurement of angular magnitudes upon the blades of propellers, in the course of testing the propeller blade or bringing it to the point where its surfaces follow the intended formula for the particular blade, and have the proper pitch.

In effect, former pitchometers have comprised a rod which is intended to be brought into parallelism with the axis of the propeller being measured, a plate pivotally mounted upon and cooperating with the rod to indicate these angular magnitudes, and intended to be placed in a plane at right angles to a plane radially of the propeller axis, and trammel points upon the lower edge of the plate to contact with the propeller blade along circles of known diameter, and thus by reference to charts it was possible to determine if the pitch angle at the particular diameter being measured corresponded to that required by the propeller's formula, or if the pitch distance was correct at a given diameter.

Because of the material necessarily surrounding the pivot point of the plate, and because the base line of the angular measure upon the plate must pass through the pivot axis, the trammel points upon the plate were of necessity below the base line through the pivot of the plate upon the rod. Any appreciable angular movement of the plate away from the horizontal throws these trammel points, one farther away from a plane radially of the propeller axis and including this pivot axis, and the other closer in toward that plane, and consequently the actual points of contact would not be equidistant from such a plane. All this will be made clear in the discussion of the diagrams. This error might be compensated for by shifting the sight rod which was intended for alignment with the propeller axis, but this introduces an element of uncertainty and guesswork, and to some extent impairs the accuracy of the measurement. Also it makes it necessary, in order that the points might both contact with the circle of known diameter, that the plate be inclined somewhat out of the exact plane perpendicular to the radial plane through the propeller axis, and the plate's pivot axis does not lie in this plane. Otherwise, one point might rest upon this circle, and the other be inside or outside of the circle, as the case might be.

In larger machines of the type illustrated in my Patents Nos. 1,547,380 and 1,932,103, the latter feature was accentuated by reason of the fact that the sight rod or drop rod was held rigidly in a guide to slide vertically and to be held so that the pivot axis of the plate thereon was always in the radial plane through the propeller axis, and the rod could not be twisted. Consequently, shifting of the trammel points laterally necessitated that one or the other be exactly upon the circle, and the other off the circle, or both would have to be off the circle, and this introduced an error of measurement. Furthermore, there was the error attributable to the fact that the points of contact of the trammel points with the blade were not equidistant from and at opposite sides of the radial plane through the axis and including the pivot of the plate.

It is the object of my present invention to eliminate these sources of error, and to provide a pitchometer which shall be to a high degree precisely accurate, so that the points of contact of the trammel points with the blade shall always be equidistant from and at opposite sides of a radial plane through the propeller axis and including the pivot axis of the plate, and hence, so that these trammel points may always lie in a common chord, the median point of which is in the radial plane mentioned, or permitting the trammel points both to contact in the common circle at the given diameter, and neither one to lie off that circle.

It is a further object to devise a pitchometer having means incorporated in it for accomplishing the above end, which means shall be adaptable to the hand tool or to the more complicated machine, and a device which will be capable of accuracy in manufacture and assembly, yet simple to make, and automatic in its operation.

My invention comprises the novel parts and the novel combination and arrangement thereof, as shown in the accompanying drawings, described in the specification, and as will be more particularly defined by the claims which terminate the same.

In the accompanying drawings I have shown my invention in diagrammatic form, and then have shown the same in conjunction with the operative machine with which it will find its greatest usefulness.

Figure 1 is a face view of the tool most generally used in such measurements, of the type shown in my Patent No. 1,932,103, referred to above.

Figure 2 is a side elevation of such a tool.

Figure 3 is a detail sectional view, taken on the line 3—3 of Figure 1.

Figure 4 is a diagrammatic face view of a simple hand tool, and Figure 5 a similar view of the same in a different position.

Figure 6 is a diagram of the bearing points of the tool in the position of Figure 4, and Figure 7 a corresponding diagram of the bearing points when the tool is in the position of Figure 5.

Figure 8 is a view similar to Figure 4, diagrammatically illustrating my improved tool, and Figure 9 is a view corresponding to Figure 5 of the improved tool.

Figure 10 is a diagram similar to Figure 6 and Figure 11 is a diagram similar to Figure 7, showing the bearing points of the tool in the positions of Figures 8 and 9, respectively.

The parts of the tool may take various forms and shapes, but usually it is essential that there be a sight rod or drop rod 1 which is intended to be maintained parallel to the axis of the propeller being measured. Associated with this, and usually pivotally supported upon an axis at 12, is an angle measuring device, such as the plate 2. The plate is intended to be maintained in a plane perpendicular to a plane radially through the propeller axis and parallel to that axis. Movement of the plate about its pivot, relative to the rod 1, gives an opportunity to measure and indicate angular magnitude, but in the form shown in Figures 1, 2 and 3 the indication is not directly between the plate 2 and rod 1, though it might well be, but rather a dial 20 is pivoted at 21 upon the rod 1, and is connected by a pinion 22 to a gear segment 23 upon the plate 2. Thus the movement of the plate is magnified, causing much greater movement of the dial 20, whereby the index 11, carried upon the rod 1 or a bracket 13 supported thereon, will cooperate with lines and graduations upon the dial 20 to indicate in effect the angular displacement of the plate 2 from a zero position, actually the pitch distance at a number of different diameters.

To complete the tool, in addition to the sight rod 1, the plate 2, and indicating devices, there must be two spaced points for contact with the propeller blade B, and connected in such manner as to control movement of the plate 2. Such points are illustrated at 3 and 30. In the hand tool shown in Figures 4 and 5, the points 3 and 30 are formed directly upon the plate 2', and of necessity depend below the base line L.

For the present let us consider the hand tool thus formed. If it could be conceived that the blade surface to which the trammel points 3 and 30 are applied was level, then the base line L of the tool would be level, as in Figure 4 (that is, at right angles to the sight rod 1 which is aligned with the propeller axis). In that case the points 3 and 30 would engage the surface of the blade, indicated by the line S in Figure 4, at points P and P' which lie both on the same circle C struck from the axis of the propeller, and both points would be equidistant from and at opposite sides of a plane radially through the axis of the propeller, indicated in Figure 6 by the line A. In other words, since the points P and P' lie on a circle, a line connecting them would define a chord of that circle, and the plane A would bisect that chord.

This, however, is a theoretical condition, for the surface of the propeller blade, being of the nature of a screw, cannot be perpendicular to the axis of the propeller, and therefore the plate 2' cannot have its base line level. The true condition, then, is such as is represented in Figure 5. The base line L has been tilted to lie parallel to the general plane of the surface S', and because the points P and P' are below this base line, they are thrown to one side of the points P and P' which are the projections of these points from a level plane, and the points 3 and 30 actually contact with the surface S at points X and X'. The zero line of the plate 2', which formerly coincided with the plane A, is now displaced, as indicated at Z in Figure 5, to one side of the plane A. This throws the trammel point 3 well inside the proper position at P, and the trammel point 30 is thrown somewhat outside the proper position, indicated at P'.

Referring to Figure 7, if we conceive that the drop rod 1 is so held that it cannot be shifted laterally, or twisted, we find the point X does not strike the extremity C at the extremity of the chord which includes the points P and P'. If the point X is made to coincide with the circle C, the point X' will lie outside that circle. If the point X' is made to coincide with the circle, the point X does not lie on the circle. Since accuracy is only obtained by maintaining both points upon the circle, and equidistant from and at opposite sides of the plane A which is a radial plane through the propeller axis, and including the pivot 12 of the plate upon the drop rod, it follows that the accuracy of the measurement is destroyed.

It has been found in practice that this inaccuracy is not of great moment in ordinary operations, and does not become serious except as the pitch angle approaches a high angle. However, since it is desired to produce propellers which are exactly accurate, and thereby to eliminate vibration and loss of power, it is not possible by old methods and devices to approach the necessary degree of accuracy.

The inaccuracy is seen to occur, from study of Figures 4 to 7 inclusive, from the fact that the two trammel points do not touch the circle, in the course of the ordinary measurement, and do not lie both in a common chord of that circle. Accordingly, I have provided a parallelogram mounting of the trammel points which will maintain them always equidistant from the radial plane through the propeller axis and including the pivot 12 of the plate, and which will maintain them in such relative position that they can both touch the same circle in all positions.

Referring now to Figures 1 and 2, the trammel points 3 and 30 are formed at the lower ends of links 31 and 32, respectively, which at their upper ends are pivoted to the plate 2, at the points 33 and 34, these points being equidistant from the pivot point 12, and at opposite sides thereof, and, when the plate 2 is in zero position and the rod 1 is vertical, it is preferable that a straight line join the pivot axes 33, 12 and 34, and that this line be level. The lower end of the rod 1 is extended somewhat below the pivot axis at 12, as shown at 14, and a lever 39 is pivoted at 38 directly below the pivot 12, and at its opposite ends it connects to the links 31 and 32 at the points 35 and 36. The lever 39 is arranged to be parallel to the line drawn through the pivots 33, 12 and 34, and the distances between pivots on the lever 39 are the same as the distances between 33 and 12, and 34 and 12, and thus there is formed a parallelogram, whereby the links 31 and 32 are always maintained parallel to each other, and are always maintained at equal distances upon opposite sides of a median plane which includes the pivot axes at 12 and 38.

The action of such an arrangement is diagrammatically shown in Figures 8 to 11 inclusive, and in Figures 8 and 9 a second lever 37 has been substituted for the portion of the plate to which is pivoted the links 31 and 32, and which carries the pivot 12. With the parts in the horizontal position, corresponding to Figure 4, the trammel points 3 and 30 make contact at the points P and P', as in Figure 6. Now as the points are applied to the circle C upon the inclined surface S' the tilting of the levers 37 and 39 shortens the rectilinear distance from the pivot points 12 and 38 to the trammel points, but the two points approach the plane A by the same amount, so that the points of their contact with the circle C, represented at Y and Y', are but slightly inside the points P and P', and each by an equal amount inside, and in effect they contact with the circle at the extremity of nearly the same chord. Whatever variation arises because the two chords are not precisely identical is compensated for in the calibration of the dial 20.

To a certain extent the errors produced by the form of tool shown in Figures 4 and 5 can be compensated for if the hand tool is used, but the operative machine used in such determinations includes a rigid vertical guide 4 carried at the end of a lateral arm 40, which arm is adjustable in and out in a rigid guide 41 carried upon a post 42 which is centered by cones or like members 43 in the hub of the propeller. These various parts are so designed that the index member 11 and the pivot axis 12 lie in the radial plane through the propeller axis, and consequently there is no lateral shifting of the trammel points possible in this form. The drop rod 1 carries a rack bar 15 which effects its vertical movement by a pinion (not shown) controlled by the hand wheel 16 carried upon the guide 4. In like manner lateral movement of the arm 40 is controlled by a rack and pinion arrangement under the control of a hand wheel 44. In consequence of the impossibility of shifting to compensate for the error, the parallelogram arrangement is of particular importance in association with the large operative tool shown in Figures 1, 2 and 3, although it would be found useful also upon the hand tool.

What I claim as my invention is:

1. In a pitchometer, in combination, a rod adapted to be disposed in definite relationship to the propeller axis, a pair of spaced trammel points adapted to contact with the propeller blade, an angle-measuring device separate from said trammel points and pivotally supported upon said rod, means operatively connecting said device and the trammel points to move the device relatively to the rod in accordance with the position assumed by the trammel points, and means automatically operable to maintain said trammel points, for all operative positions thereof, equidistant from and at opposite sides of a radial plane of the propeller through the pivot of the angle-measuring device.

2. In a pitchometer, in combination, a rod adapted to be disposed in definite relationship with the propeller axis, a graduated plate disposed in a plane at right angles to a radial plane through the propeller axis, and parallel to the propeller axis, said plate being pivotally supported for movement in its own plane upon the rod, and cooperating with the rod to measure angular magnitudes, a pair of spaced trammel points separate from the plate and independently supported from the rod, and adapted to contact with the blade of the propeller, means operatively connecting the trammel points to the plate to move the latter in accordance with the movement of the trammel points, so that by the relative position of the trammel points they determine the position of the plate relative to the rod, the operative connection between the trammel points and plate including means to maintain the trammel points, for all positions, in a chord of the circle upon the blade at the diameter being measured, and equidistant from and at opposite sides of its median point.

3. In a pitchometer, in combination, a support for application to a propeller including a guide outwardly of and parallel to the propeller axis, a drop rod slidable in said guide, a plate pivotally supported upon said rod about an axis disposed in a radial plane through the propeller axis, and at right angles to such axis, said plate and rod cooperating to indicate angular magnitudes, a pair of trammel points adapted for contact with a propeller blade, defining a line below the pivot axis of said plate at all times, and means to support the trammel points from the plate, and to confine them to movement through parallel positions, parallel to and equidistant at opposite sides of a plane radially of the propeller axis and including the axis of the plate upon the rod.

4. In a pitchometer, in combination, a support for application to a propeller including a guide outwardly of and parallel to the propeller axis, a drop rod slidable in said guide, a plate pivotally supported upon said rod upon an axis disposed in a radial plane through the propeller axis, and at right angles to such axis, said plate and rod cooperating to indicate angular magnitudes, a pair of trammel points pivotally supported upon said plate about axes parallel to and equidistant from the pivot axis of the plate upon the rod, and a lever pivoted respectively upon the rod and trammel points, to confine the latter to movement through parallel positions, parallel to and equidistant at opposite sides of a plane radially of the propeller axis and including the axis of the plate upon the rod.

5. In a pitchometer, in combination, an upright rod adapted to be disposed parallel to the propeller axis, a pair of links spaced apart and each terminating at its lower end in a trammel point adapted to contact with the propeller blade, an angle-measuring plate pivotally supported upon said rod and movable relative thereto, said links being pivotally supported by their upper ends from said plate, at opposite sides of and equidistant from the pivotal support of the plate, whereby the plate is movable relative to the rod in accordance with the positions assumed by the trammel points, and means to maintain said links, for all positions, equidistant from and parallel to a plane radially of the propeller and including the pivot of the angle-measuring device.

6. In a pitchometer, in combination, an upright rod adapted to be disposed parallel to the propeller axis, a pair of links spaced apart and each terminating at its lower end in a trammel point adapted to contact with the propeller blade, an angle-measuring plate pivotally supported upon said rod and movable relative thereto, said links being pivotally supported by their upper ends from said plate, at opposite sides of and equidistant from the pivotal support of the plate, whereby the plate is movable relative to the rod in accordance with the positions assumed by the trammel points, and a lever pivoted between its ends upon the rod offset from the plate's pivot, and pivotally engageable with each link at a distance equal to the distance from the plate's pivot to the pivot of the links upon the plate, thereby to confine the links to movement through parallel positions, at opposite sides of, parallel to, and equidistant from a plane radially of the propeller axis and including the axis of the plate upon the rod.

7. In a pitchometer, in combination, a support and a member pivotally mounted thereon, the two constituting a gauging pair, with one of which is associated a scale and with the other of which is associated a cooperating index, means to dispose the support in definite relationship to the propeller axis, trammel points mounted upon and controlling movement of the pivoted member, and depending below the pivot axis of the gauging pair, and means to maintain said trammel points, for all positions of the member relative to the support, in that plane perpendicular to a radial plane of the propeller which includes the pivot axis referred to, and equidistant from and at opposite sides of such radial plane.

8. In a pitchometer for measuring screw propellers, a support and a member pivotally mounted thereon, the two constituting a gauging pair, with one of which is asociated a scale and with the other of which is associated a cooperating index, means to dispose the support in definite relationship to the propeller's axis, means supporting the trammel points from said support, and means operatively connecting the trammel points to move the pivoted member relatively to said support, and the trammel point supporting and connecting means being disposed and arranged to effect movement of the points closer together as the pitch angle of any given blade increases, nearer the propeller axis, and farther apart as the pitch angle thereof decreases, nearer the blade's tip.

9. In a pitchometer, in combination, a support and a member pivotally mounted thereon, the two constituting a gauging pair, with one of which is associated a scale and with the other of which is associated a cooperating index, means to dispose the support in definite relationship to the propeller axis, trammel points separate from said member and supported from said support for movement relatively thereto towards and from the pivot of said member, means operatively connecting the trammel points and said member to move the latter in accordance with movement of the trammel points, said latter means including means to maintain said trammel points, for all positions of the pivoted member, in a plane perpendicular to a radial plane of the propeller, and equidistant from and at opposite sides of such radial plane.

BERT O. GODFREY.